United States Patent
Le et al.

(10) Patent No.: US 8,019,511 B2
(45) Date of Patent: Sep. 13, 2011

(54) VEHICLE ROLLOVER DETECTION

(75) Inventors: Jialiang Le, Canton, MI (US); Clifford C. Chou, Farmington Hills, MI (US); Saeed David Barbat, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 705 days.

(21) Appl. No.: 12/125,091

(22) Filed: May 22, 2008

(65) Prior Publication Data

US 2009/0292424 A1    Nov. 26, 2009

(51) Int. Cl.
*B60R 22/00* (2006.01)
(52) U.S. Cl. .......................................... 701/46
(58) Field of Classification Search .............. 701/45, 701/46, 36, 37, 38; 280/5.506, 5.507, 5.508, 280/5.509
See application file for complete search history.

(56) References Cited

U.S. PATENT DOCUMENTS

| | | | |
|---|---|---|---|
| 5,825,284 A | 10/1998 | Dunwoody et al. | |
| 6,065,558 A | 5/2000 | Wielenga | |
| 6,684,140 B2 | 1/2004 | Lu | |
| 6,904,351 B1 | 6/2005 | Hac | |
| 6,961,648 B2 | 11/2005 | Salib et al. | |
| 7,079,928 B2 | 7/2006 | Lu et al. | |
| 7,590,481 B2 * | 9/2009 | Lu et al. | 701/70 |
| 2003/0055549 A1 | 3/2003 | Barta et al. | |
| 2004/0041358 A1 | 3/2004 | Hrovat et al. | |
| 2005/0033486 A1 | 2/2005 | Schmitt et al. | |
| 2005/0288842 A1* | 12/2005 | Brewer et al. | 701/70 |
| 2006/0076741 A1* | 4/2006 | Lim | 280/5.508 |
| 2008/0059021 A1* | 3/2008 | Lu et al. | 701/36 |
| 2010/0017058 A1* | 1/2010 | Lu et al. | 701/38 |
| 2010/0017061 A1* | 1/2010 | Lu et al. | 701/41 |
| 2011/0042975 A1* | 2/2011 | Faruque | 293/118 |

* cited by examiner

*Primary Examiner* — Faye M. Fleming
(74) *Attorney, Agent, or Firm* — Frank A. MacKenzie; Brooks Kushman P.C.

(57) ABSTRACT

A system and method for detecting a rollover of a vehicle that includes at least one wheel reaction force sensing device for transmitting wheel reaction force signals indicative of an amount of force exerted on at least one wheel of the vehicle is provided. The system includes a controller operably coupled to the at least one wheel reaction force sensing device and including at least one accelerometer sensor for transmitting acceleration signals. The controller is configured to determine a first force index in response to the wheel reaction force signals, determine a first lateral acceleration of the vehicle in response to the acceleration signals, compare the first force index to a threshold force index and the first lateral acceleration to a threshold lateral acceleration, and deploy a restraint system based on the comparison.

17 Claims, 8 Drawing Sheets

VEHICLE ROLLOVER DETECTION

BACKGROUND

1. Technical Field

The embodiments of the present invention generally relate to a vehicle rollover accident detection.

2. Background Art

The number of fatal accidents each year in the U.S. has hovered at about 40,000 for a decade. Safety organizations, the government, and industry are working diligently to reduce that number to 30,000. Rollover based accidents account for about 30% of light-vehicle fatal accidents. A portion of vehicle rollovers may be attributed to 'hard trips' where a vehicle enters into a rollover state after traveling over a curb or obstacle. Other such vehicle rollovers may be attributed to 'soft trips' where a vehicle enters into a rollover state after traveling over sand or grass lands.

In view of the number of fatalities associated with rollover accidents, original equipment manufactures (OEMs) are continuing to develop sensing algorithms to detect vehicle rollovers and implementing various advanced restraint systems to mitigate injuries of occupants from being ejected while the vehicle encounters a roll over event.

SUMMARY

In at least one embodiment, a system for detecting a rollover of a vehicle that includes at least one wheel reaction force sensing device positioned about at least one wheel of the vehicle for transmitting wheel reaction force signals indicative of an amount of force exerted on the at least one of the wheels of the vehicle is provided. The system includes a controller operably coupled to the at least one wheel reaction force sensing device and at least one accelerometer sensor for transmitting acceleration signals indicative of vehicle body accelerations about at least one axis of the vehicle. The controller is configured to determine a first force index in response to the wheel reaction force signals, determine a first lateral acceleration of the vehicle in response to the acceleration signals, compare the first force index to a threshold force index and the first lateral acceleration to a threshold lateral acceleration, and deploy a restraint system based on a comparison of the first force index to the threshold force index and the lateral acceleration to the threshold lateral acceleration.

DETAILED DESCRIPTION

Figure 1:
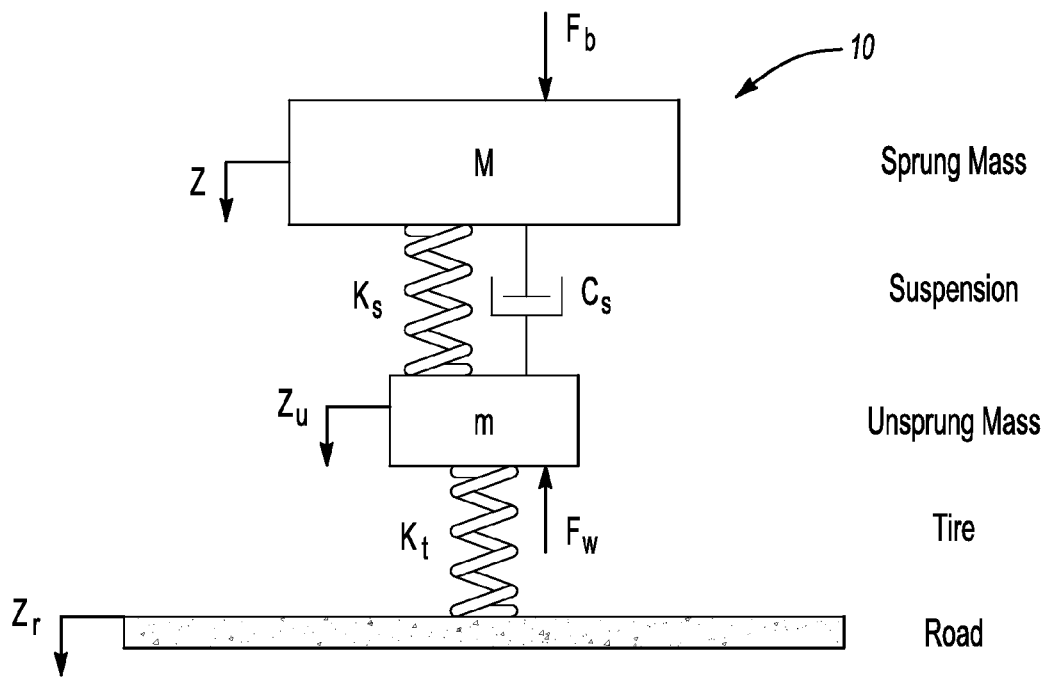
FIG. 1 depicts a quarter-model vehicle suspension in a steady-state condition.

Referring now to FIG. 1, a quarter-model vehicle suspension 10 in a steady-state condition is shown. The dynamic behavior for the quarter-model vehicle suspension 10 may be obtained by applying Newton's second law for the sprung and unsprung mass as shown in FIG. 1. For example, the equation of motion for the unsprung mass is:

$$M\ddot{Z}_u + C_s\dot{Z}_u + (K_s+K_t)Z_u = C_s\dot{Z} + K_sZ + K_sZ_r + F_w \quad \text{(EQ. 1)}$$

where,
M=mass,
Z=sprung mass displacement,
$Z_u$=unsprung mass displacement,
$Z_r$=road displacement,
$F_w$=force on the unsprung mass,
$K_s$=suspension stiffness,
$K_t$=wheel stiffness, and
$C_s$=suspension damping coefficient.

EQ. 1 may be simplified by neglecting higher order items. In light of such, the force on the unsprung mass may be rewritten as:

$$F_w \approx f(Z, Z_u, Z_r) = (K_s+K_t)Z_u - K_sZ - K_tZ_r + \text{errs} \quad \text{(EQ. 2)}$$

In general, the loads (or force on the unsprung mass) are equivalent between left and right sides of the vehicle when the vehicle is on a horizontal surface with steady movement. However, the loads on the unsprung mass are different (e.g., between the left and right side of the vehicle) when the vehicle experiences a rollover event. In such a case, the vehicle may be unstable and lean to roll one side of the vehicle. The load on the leaned side of the vehicle may be high, while the load on the other side of the vehicle may be close to zero.

Figure 2:
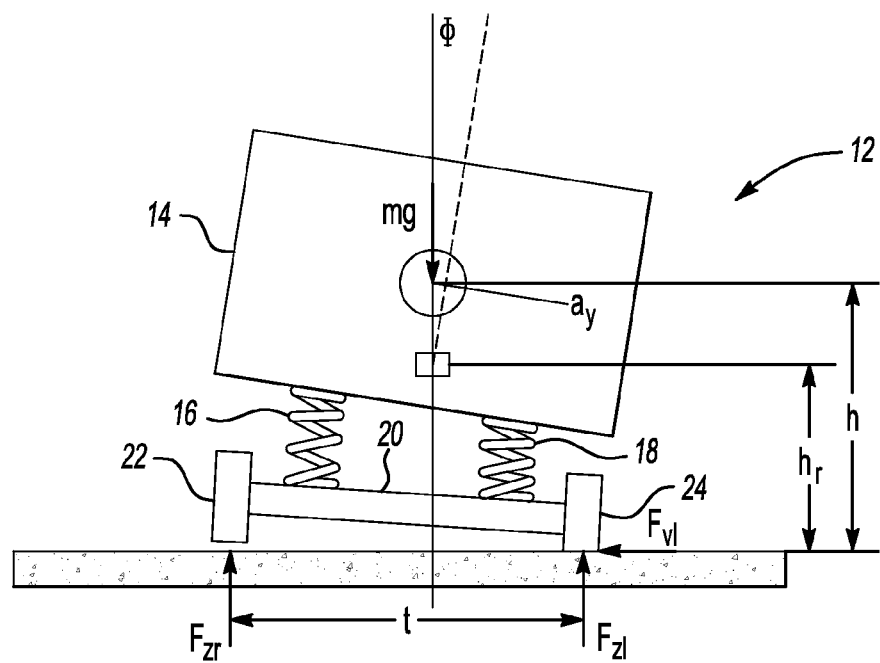
FIG. 2 depicts a roll reaction on a suspended vehicle.

Referring now to FIG. 2, a roll reaction on a suspended vehicle 12 is generally shown. The suspended vehicle 12 includes a body section 14 that is represented by a mass, m. A plurality of springs 16 and 18 are coupled to the body section 14. The springs 16, 18 couple the body section 14 to an axle 20 having wheels 22, 24. The body section 14 of the vehicle 12 includes a roll center which provides a pivot point for the body section 14 in which lateral forces are transferred from the axle 20 to the mass. By taking moments about a point where the wheel 24 contacts the ground and assuming the trailing side load of the wheel 22 (e.g., wheel off of the ground) is equal to zero provides the following:

$$\sum M_o = 0 = ma_yh - mg\left[\frac{t}{2} - \phi(h-h_r)\right] \quad \text{(EQ. 3)}$$

From EQ. 3, the lateral acceleration (e.g., $a_y/g$) is found to be:

$$\frac{a_y}{g} = \frac{t}{2h} - \phi\left(1 - \frac{h_r}{h}\right) \quad \text{(EQ. 4)}$$

As shown in EQ. 4, an unstable lateral acceleration generally depends on vehicle track width t, center of gravity (g), height h, the roll center $h_r$, and roll angle $\phi$.

As exhibited above, lateral acceleration plays a role during rollover crashes. While front forces on the vehicle are discussed, rear forces on the rear of the vehicle or a combination of front and rear forces on the entire vehicle are equally contemplated. The wheel 24 at the leading side of the vehicle (e.g., the leading side of the vehicle may include one wheel at the front of the vehicle or two or more wheels at the front and rear of the vehicle) may receive an early and larger force than the wheel 22 at the trailing side of the vehicle (e.g., the trailing side of the vehicle may include one wheel at the front of the vehicle or two or more wheels at the front and rear of the vehicle) whether the vehicle is in a trip (e.g., hard or soft) rollover event. For example, a mean value of the forces acting on both sides of the front of the wheels (e.g., left and right) or to both sides of the front and rear wheels (e.g., left and right) may be measured as follows:

$$F_{mean} = \frac{F_{zl} + F_{zr}}{2} \qquad (EQ. 5)$$

where, $F_{mean}$ corresponds to a mean value of force at the wheels before a rollover event is detected. $F_{zl}$ may correspond to left wheel reaction forces that act on the left wheel on the front of the vehicle or to two or more left wheels on both the front and rear of the vehicle. left and right wheel reaction forces that act on the wheels on the front and the rear of the vehicle. $F_{zr}$ may correspond to right wheel reaction forces that act on the right wheel on the front of the vehicle or to two or more right wheels on both the front and rear of the vehicle. In general, a wheel reaction force is the load transmitted through the wheel(s) (e.g., the tire, rim and/or suspension components due to the sprung mass). A force index may be calculated by:

$$index_F = \begin{cases} \dfrac{F_{zl} + F_{zr} - 2F_{mean}}{F_{mean}} & \text{where } index_f \geq 0 \\ 0 & \text{where } index_f < 0 \end{cases} \qquad (EQ. 6)$$

where, in one example, $index_F$ is generally a value that is larger than zero and less than two. In the event $index_F$ is larger than 0.5, then one or both wheels on the left side may be lifted from the ground and the other such wheel(s) on the right side may be in contact with the road. Likewise, in the event $index_F$ is larger than 0.5, then one or both wheels on the right side may be lifted from the ground and the other such wheel or wheels on the left side may be in contact with the ground. If $index_F$ is zero, then the vehicle may be considered to be airborn.

Figure 3:
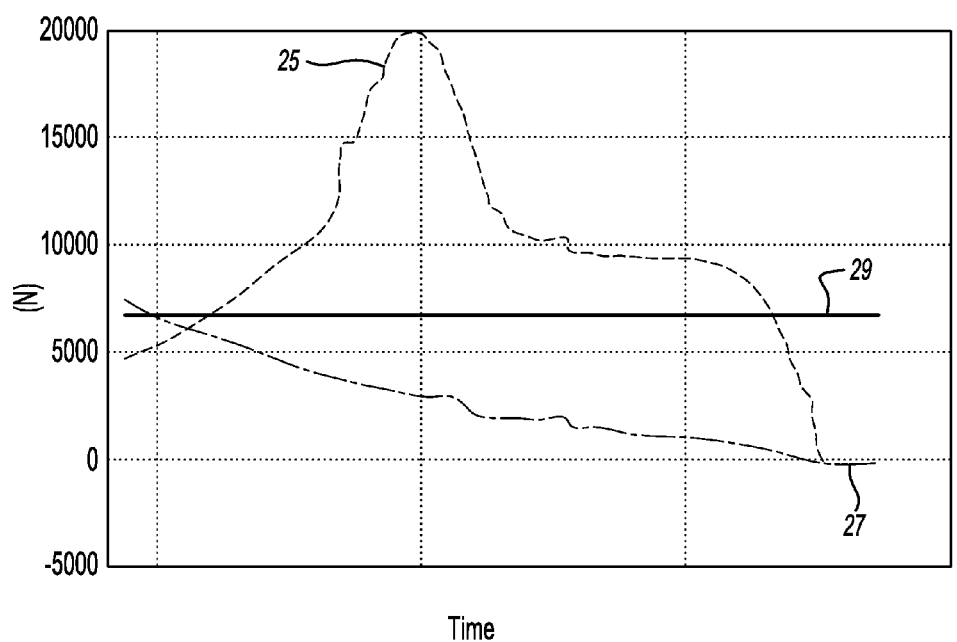
FIG. 3 depicts wheel reaction forces in accordance to one embodiment of the present invention.

FIG. 3 illustrates wheel reaction forces for wheels at the front side of the vehicle. Values that correspond to a wheel reaction force at the leading side of the left front wheel (e.g., $F_{zl}$, see EQ. 5) are generally shown at 25. Values that correspond to a wheel reaction force at the trailing side of the left front wheel (e.g., $F_{zr}$, see EQ. 5) are generally shown at 27. Values that correspond to a pre-calculated average of a wheel reaction force (e.g., $F_{mean}$, see EQ. 5) are generally shown at 29.

In general, the system and schemes as set forth herein to detect vehicle rollover events may take into account both the $index_F$ and lateral acceleration to determine whether the vehicle is experiencing a rollover event. The $index_F$ and lateral acceleration may provide an early detection that the vehicle is experiencing a hard or soft trip rollover event. In addition, other characteristics such as the roll rate and the roll angle may serve as an early indication to detect whether the vehicle is experiencing a vehicle rollover.

Figure 4:
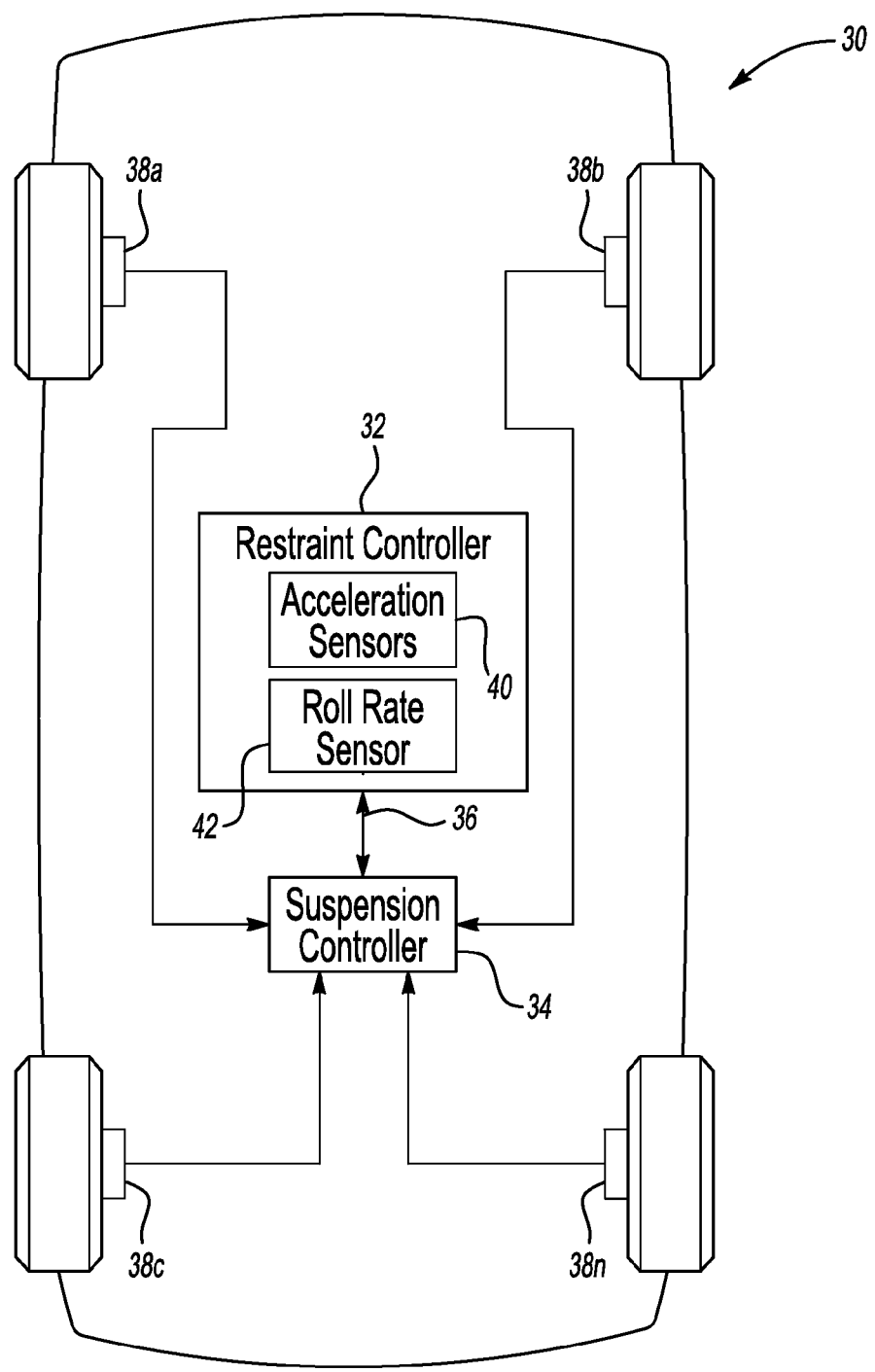
FIG. 4 depicts a rollover detection system in accordance to one embodiment of the present invention.

Referring now to FIG. 4, a rollover detection system 30 in accordance to one embodiment of the present invention is shown. The system 30 includes a restraint controller 32 and a suspension controller 34. A multiplexed communication bus 36 is operably coupled between the restraint controller 32 and the suspension controller 34 to facilitate data communication therebetween. The bus 36 may be implemented as either a high or medium speed control area network (CAN) communication data link. The bus 36 may be implemented as any such communication data link generally situated to transmit data between any two controllers in a vehicle.

A plurality of wheel reaction force sensing devices 38a-38n are in electrical communication with the suspension controller 34. Each wheel reaction force sensing device 38a-38n is generally positioned about the suspension system at each wheel/tire of the vehicle. In general, the wheel reaction force sensing devices 38a-38n are generally configured to sense the force associated with various loads applied at one or more wheels of the vehicle. The suspension controller 34 receives such information to determine the wheel reaction force (e.g., $F_{zl}$ and $F_{zr}$) for each wheel. In another example, the wheel reaction force sensing devices 38a-38n may measure signals from a pressure sensor and/or acceleration sensors and transmit such data directly to the suspension controller 34 to determine the wheel reaction force for each wheel. Other such examples of wheel reaction force sensing devices 38a-38n may include a pressure sensor positioned in an active air suspension that may measure the force, a strain gauge, wheel lateral force sensors, longitudinal wheel force sensors, a vertical tire force sensor, a tire acceleration sensor, or a tire sidewall torsion sensor.

As noted above in connection with FIG. 2, the suspension controller 34 may include $F_{mean}$ (e.g., the mean value of force at the front wheels and/or the rear wheels of the vehicle before a rollover event) stored in memory therein. The suspension controller 34 may calculate the force index (e.g., see EQ. 6) for the wheels at the front and/or the rear of the vehicle in response to such information and transmit such information over the bus 36 to the restraint controller 32.

The restraint controller 32 includes a plurality of accelerometer sensors 40 positioned therein. The accelerometer sensors 40 are configured to measure car body accelerations about the x-axis (longitudinal acceleration), the y-axis (lateral acceleration), and z-axis (vertical acceleration). For illustrative purposes, a right hand coordinate system may be superimposed on the vehicle. The x-axis of the vehicle may be defined as the axis extending between the fore and aft portions of the vehicle. The positive direction of the x-axis may be the direction pointing towards the front of the vehicle. The y-axis of the vehicle may be defined as the axis extending from the passenger side of the vehicle to the driver side of the vehicle (e.g., the axis extending the width of the vehicle). The z-axis of the vehicle may be defined as the axis extending from the bottom to top of the vehicle. The positive directions of the y-axis and z-axis are considered to be pointing towards the driver side and in an upward direction, respectively.

In reference to the lateral acceleration, the accelerometer sensors 40 may present hardwired data which correspond to the lateral acceleration of the vehicle body to the restraint controller 32. The restraint controller 32 may calculate the lateral acceleration as noted in connection with EQ. 4. The restraint controller 32 may use the lateral acceleration and the force index as an indicator to determine if the vehicle is in a rollover event. The restraint controller 32 may deploy a restraint system to protect the occupants of the vehicle in response to the lateral acceleration and the force index exceeding predetermined thresholds. The restraint system may include curtain and/or side impact airbags that are utilized to protect the occupant.

The restraint controller 32 further includes a roll rate sensor 42 positioned therein. The roll rate sensor 42 may measure the roll rate of the vehicle. In general, the roll rate of the vehicle is defined as the angular velocity of the vehicle as the vehicle rotates about the x-axis of the vehicle. The restraint controller 32 may calculate the roll angle φ of the vehicle (as discussed in connection with FIG. 2) in response to receiving the roll rate from the roll rate sensor 42. The restraint controller 32 may use the force index and any one or more of the lateral acceleration, the roll angle, and the roll rate of the vehicle to determine when the vehicle is in a roll over state.

Figure 5:
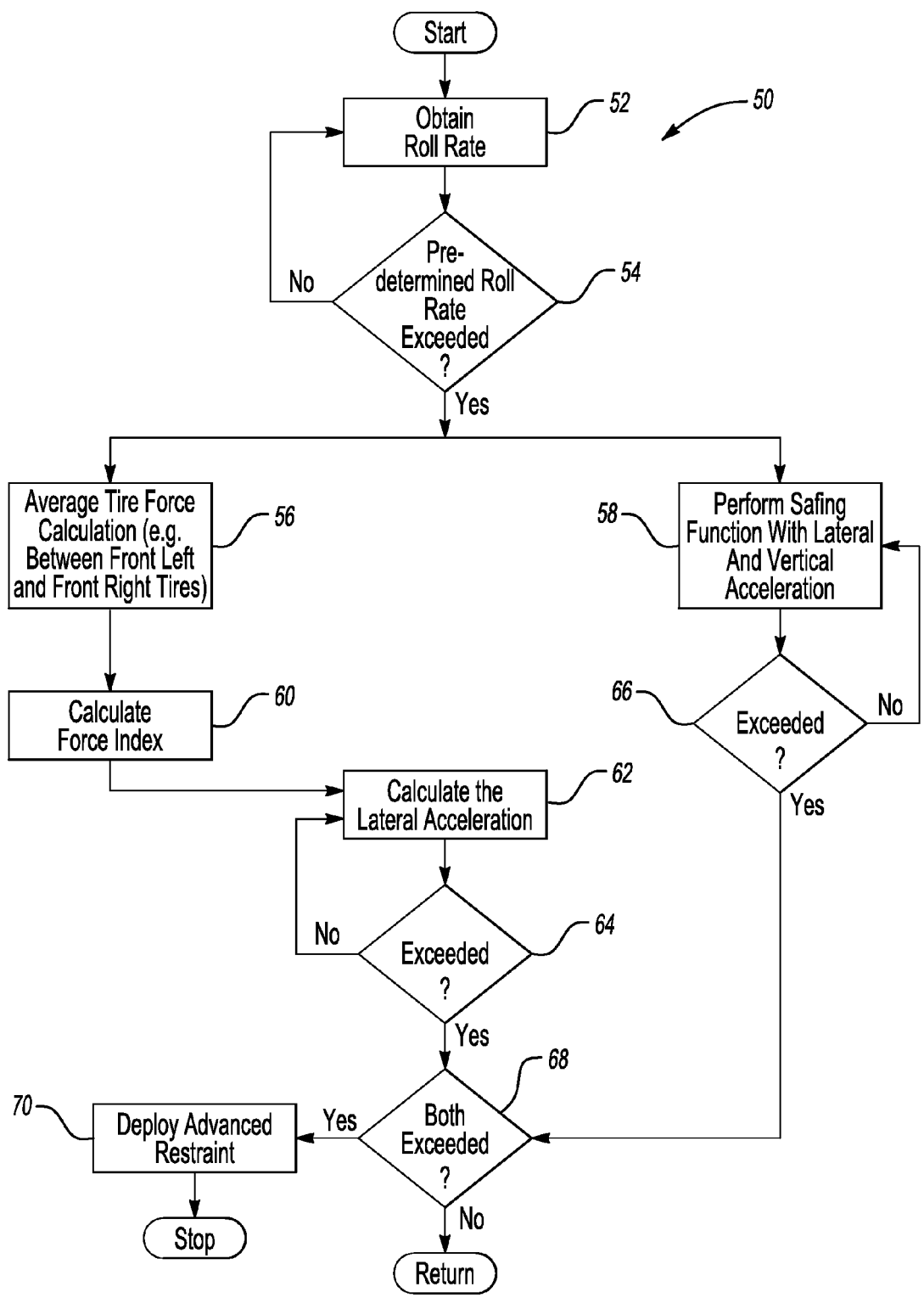
FIG. 5 depicts a first rollover detection scheme in accordance to one embodiment of the present invention.

Referring now to FIG. 5, a first rollover detection scheme 50 in accordance to one embodiment of the present invention is shown. In block 52, the restraint controller 32 receives the measured roll rate of the vehicle from the roll rate sensor 42 and filters and conditions such information to determine the roll rate.

In block 54, the restraint controller 32 determines whether the detected roll rate of the vehicle has exceeded a predetermined roll rate value. Such a value may be stored in memory of the restraint controller 32. The predetermined roll rate value may be a calibrated value and vary based on the type of vehicle that is used. The restraint controller 32 compares the roll rate to the predetermined roll rate value. If the roll rate is not greater than the predetermined roll rate value, then the scheme 50 moves to back to block 52. If the roll rate is greater than the predetermined roll rate value, then the scheme 50 moves to blocks 56 and 58.

In block 56, the restraint controller 32 calculates $F_{mean}$ as noted above in connection with EQ. 5. The restraint controller 32 receives $F_{zl}$ and $F_{zr}$ from the suspension controller 34 over the bus 36.

In block 60, the restraint controller 32 calculates the force index as noted above in connection with EQ. 6.

In block 62, the restraint controller 32 determines the lateral acceleration. The restraint controller 32 calculates the lateral acceleration in response to information transmitted by the accelerometer sensors 40 (see EQ. 4).

Figure 6:
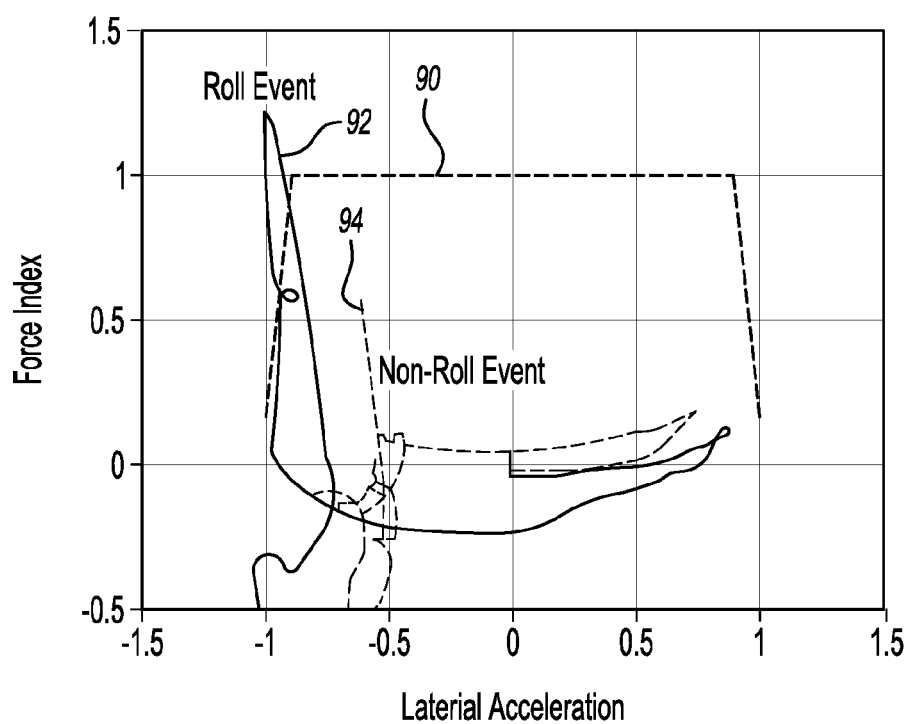
FIG. 6 depicts a force index and lateral acceleration threshold plot in accordance to one embodiment of the present invention.

In block 64, the restraint controller 32 determines whether the calculated force index and lateral acceleration exceed force index thresholds and lateral acceleration thresholds, respectively. FIG. 6 depicts the force index thresholds and the lateral acceleration thresholds at 90. The force index and lateral acceleration thresholds are generally calibrated values and may vary (e.g., may be different than that shown in FIG. 6) depending on the type of vehicle used. The thresholds 90 for the force index and later acceleration may be achieved by the following:

$$y = b\left(1 - \frac{x^2}{a^2}\right)^c \quad \text{(EQ. 7)}$$

where variables a and b are derived (or obtained) in response to performing vehicle rollover tests for a particular vehicle. The variable a and b may vary based on the type of vehicle used. Variables x and y may correspond to the values of the lateral acceleration and the force index, and c is a constant that may vary based on a threshold request.

Values corresponding to the calculated force index and the lateral acceleration that may be indicative of the vehicle being in a rollover state is generally shown at 92. Values corresponding to the calculated force index and the lateral acceleration that may be indicative of the vehicle not being in a rollover state is generally shown at 64.

In reference to FIG. 5, while blocks 56, 60, 62, and 64 are being executed, blocks 58 and 66 may be executed simultaneously for validation purposes to confirm that the vehicle is in a rollover state. In general, blocks 58 and 66 may be executed as a secondary measure to ensure that the vehicle is in a rollover state.

In block 58, the restraint controller 32 also performs a safing function. With such an operation, the restraint controller 32 determines the lateral acceleration and the vertical acceleration to determine whether such values are indicative of the vehicle being in a rollover state.

In block 66, the restraint controller 32 determines whether the lateral acceleration and the vertical acceleration exceed predefined safing values (e.g., predefined lateral and vertical acceleration safing values). The predefined lateral acceleration safing values are values that may or may not be different from the lateral acceleration threshold as noted in connection with block 64. If the lateral acceleration and the vertical acceleration do not exceed the predefined safing values, then the scheme 50 moves back to block 58. If the lateral acceleration and the vertical acceleration exceed the predefined safing values, then the scheme 50 moves to block 68.

In block 68, the restraint controller 32 determines whether the calculated force index and the lateral acceleration exceed the force index threshold and the lateral acceleration threshold, respectively, and whether the lateral acceleration and the vertical acceleration exceed the predefined safing values. If both conditions have been met, then the scheme 50 moves to block 70. If none or only one of the conditions of blocks 64 and 66 has been met, then the scheme 50 moves back to the start state.

In block 70, the restraint controller 32 deploys the advanced restraint system to protect the occupant(s).

Figure 7:
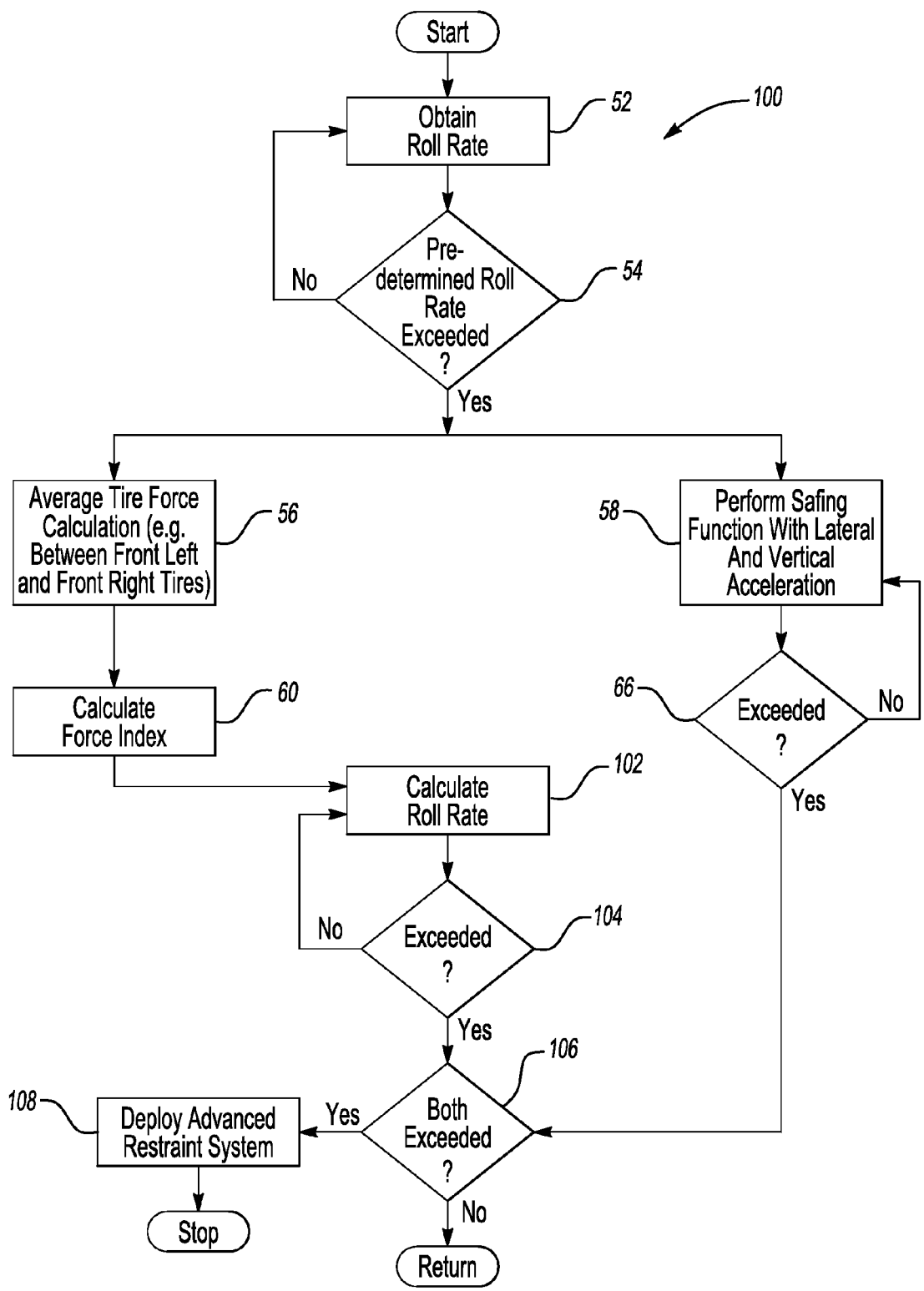
FIG. 7 depicts a second rollover detection scheme in accordance to one embodiment of the present invention.

Referring now to FIG. 7, a second rollover detection scheme 100 in accordance to one embodiment of the present invention is shown. Blocks 52, 54, 56, 58, 60 and 66 are similar to the blocks 52, 54, 56, 58, 60 and 66 of FIG. 5.

In block 102, the restraint controller 32 obtains the roll rate of the vehicle in response to information sent by the roll rate sensor 42. Block 102 is generally similar to the operation performed in block 52.

Figure 8:
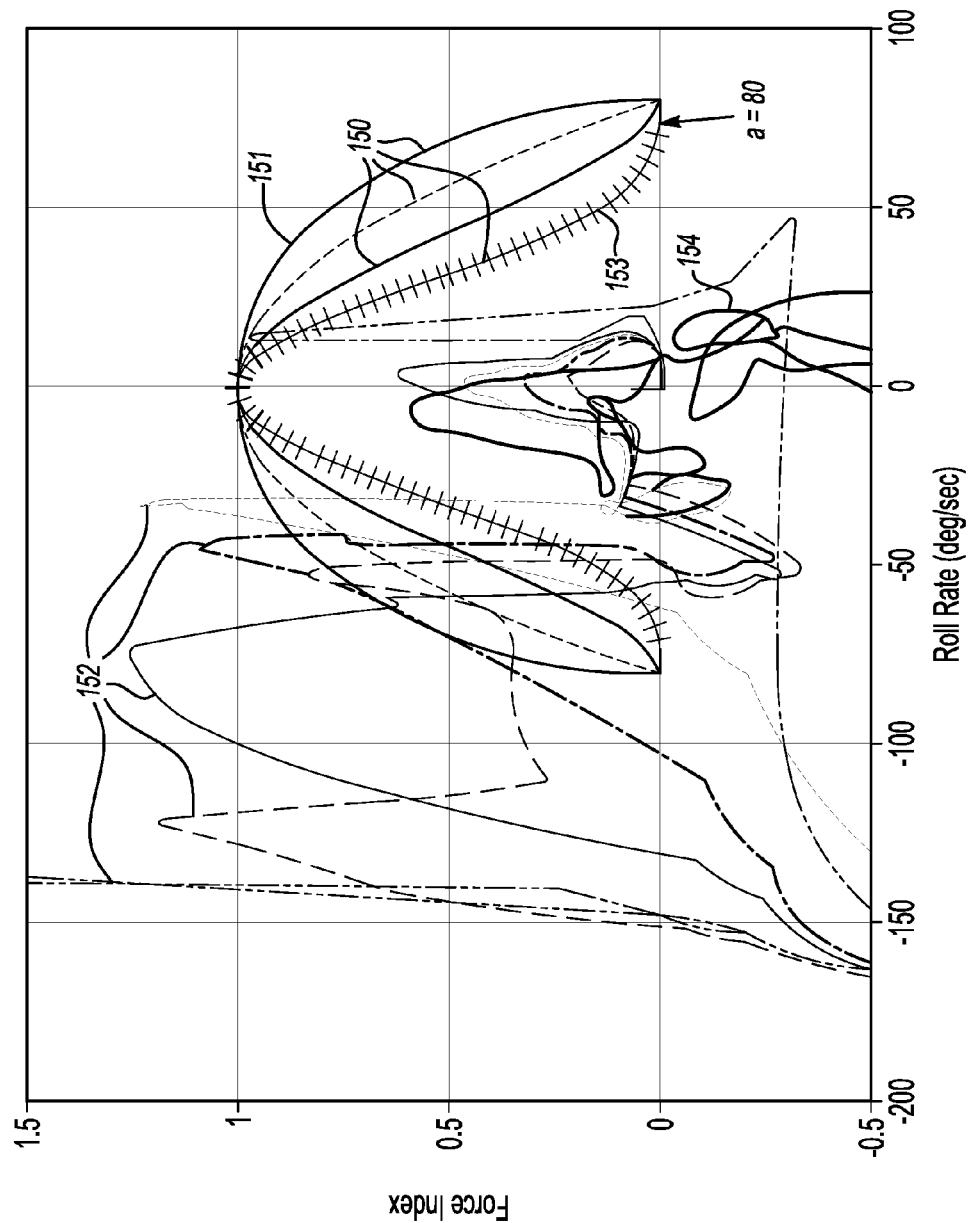
FIG. 8 depicts a force index and roll rate threshold plot in accordance to one embodiment of the present invention.

In block 104, the restraint controller 32 determines whether the calculated force index and the roll rate exceed the force index threshold and the roll rate threshold, respectively. FIG. 8 depicts the force index threshold and the roll rate threshold at 150. The force index threshold and the roll rate threshold are generally calibrated values and may vary (e.g., may be different than those shown in FIG. 8) depending on the type of vehicle used. As noted above, the thresholds 150 for the force index and roll rate may each be derived by using EQ. 7.

Variables x and y as shown in accordance to EQ. 7 may correspond to the values of the roll rate and the force index. Variables a and b are derived (or obtained) in response to performing vehicle rollover tests for a particular vehicle and c is a constant that may vary based on the threshold requirement (e.g., if c is less than 1, such a condition may correspond to an upper lobe 152 as shown in FIG. 8, if c is larger than 1, such a condition may correspond to lower lobe 153 as shown in FIG. 8).

Values corresponding to the calculated force index and the roll rate that may be indicative of the vehicle being in a rollover state are generally shown at 152 in FIG. 8. Values corresponding to the calculated force index and the roll rate that may be indicative of the vehicle not being in a rollover state are generally shown at 154 in FIG. 8.

In block 106, the restraint controller 32 determines whether the calculated force index and the roll rate exceed the force index threshold and the roll rate threshold and whether the lateral acceleration and the vertical acceleration exceed predefined safing values. If both conditions have been met, then the scheme 100 moves to block 108. If none or only one of the conditions has been met, then the scheme 100 moves back to the start state.

In block 108, the restraint controller 32 deploys the advanced restraint system to protect the occupant(s).

Figure 9:
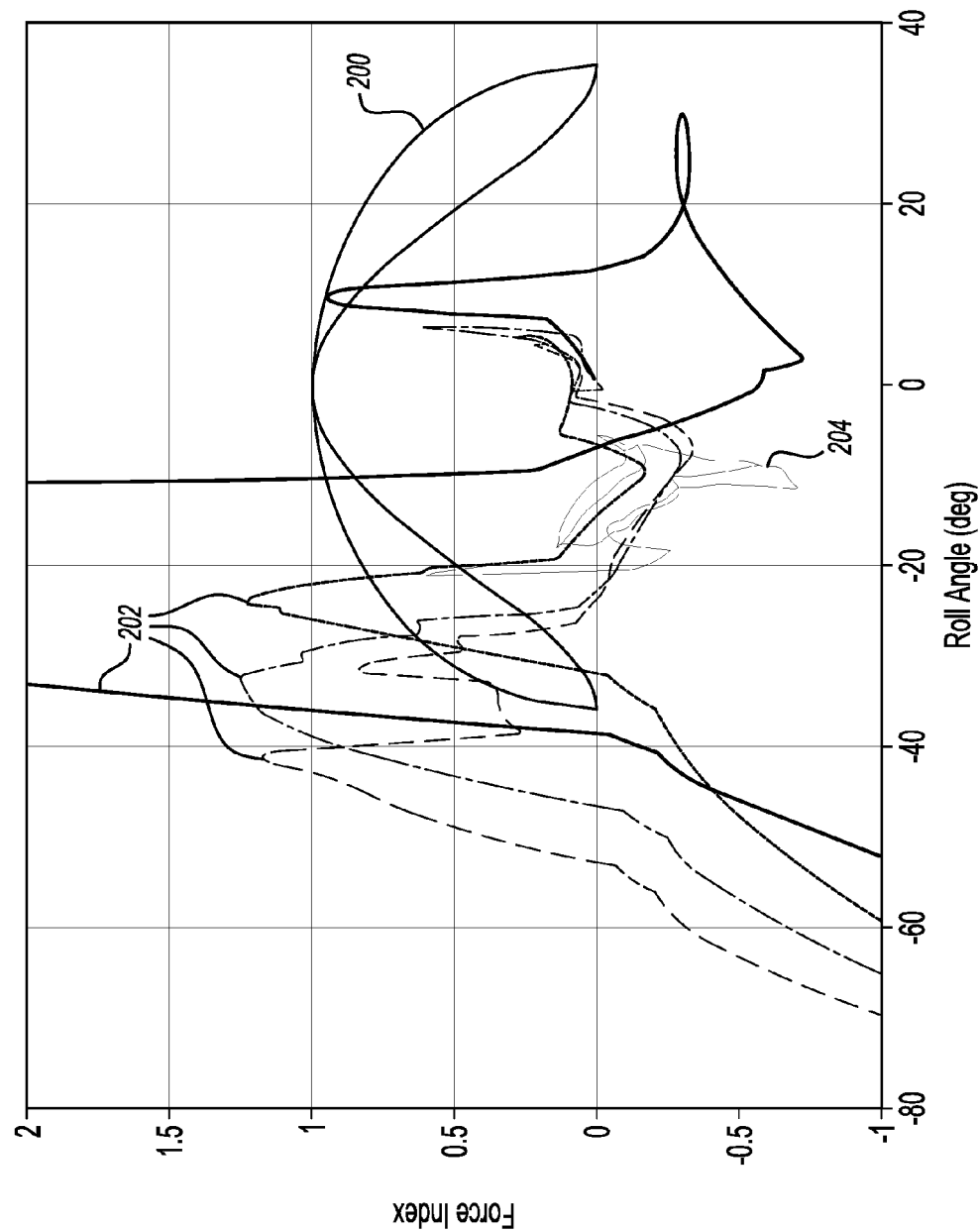
FIG. 9 depicts a force index and roll angle plot in accordance to one embodiment of the present invention.

In another embodiment, references to the roll rate as noted in connection with blocks 102, 104, and 106 may be replaced with the roll angle. For example, the block 102 may calculate the roll angle of the vehicle as opposed to the roll rate of the vehicle. The roll angle is generally defined as angular rotation of the vehicle body. The roll rate is generally the angular velocity of the vehicle body. In contrast to having a roll rate threshold (see block 104), the roll angle threshold may be established along with the force index threshold. In such an example, the restraint controller 32 may determine whether the calculated force index and the calculated roll angle exceed the force index threshold and the roll angle threshold, respectively, as shown at 200 in FIG. 9. FIG. 9 depicts the force index threshold and the roll angle threshold at 200. The force index threshold and the roll angle threshold are generally calibrated values and may vary (e.g. may be different than that shown in FIG. 9) depending on the type of vehicle used. The thresholds 200 for the force index and the roll angle may each be derived by EQ. 7 as stated above.

Values corresponding to the calculated force index and the roll angle that may be indicative of the vehicle being in a rollover state is generally shown at 202. Values corresponding to the calculated force index and the calculated roll angle that may be indicative of the vehicle not being in a rollover state is generally shown at 204.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for detecting a rollover of a vehicle that includes at least one wheel reaction force sensing device positioned about at least one wheel of the vehicle for transmitting wheel reaction force signals indicative of an amount of force exerted on the at least one of the wheels of the vehicle, the system comprising:
    a controller operably coupled to the at least one wheel reaction force sensing device and including at least one accelerometer sensor for transmitting acceleration signals indicative of vehicle body accelerations about at least one axis of the vehicle, the controller being configured to:
        determine a first force index in response to the wheel reaction force signals;
        determine a first lateral acceleration of the vehicle in response to the acceleration signals;
        compare the first force index to a threshold force index and the first lateral acceleration to a threshold lateral acceleration; and
        deploy a restraint system based on a comparison of the first force index to the threshold force index and the lateral acceleration to the threshold lateral acceleration.

2. The system of claim 1 wherein the controller is further configured to perform a safing function with the acceleration signals prior to deploying the restraint system.

3. The system of claim 2 wherein the controller is configured to determine a first vertical acceleration in response to the acceleration signals and to perform the safing function with the first lateral acceleration and the first vertical acceleration.

4. The system of claim 1 wherein the first force index corresponds to a first force measurement at one or more left wheels of the vehicle, a second force measurement at one or more right wheels of the vehicle, and an average force between the one or more left wheels and the one or more right wheels of the vehicle.

5. The system of claim 1 wherein the controller further includes at least one roll angle sensor for transmitting roll angle signals indicative of an angular rotation of the vehicle body.

6. The system of claim 5 wherein the controller is further configured to determine a first roll angle in response to the roll angle signals, to compare the first roll angle to a threshold roll angle, and to deploy the restraint system in response to a comparison of the first force index to the threshold force index and the first roll angle to the threshold roll angle.

7. The system of claim 5 wherein the controller is further configured to determine a first roll rate in response to the roll angle signals, to compare the first roll rate to a threshold roll rate, and to deploy the restraint system in response to the comparison of the first force index to the threshold force index and the first roll rate to the threshold roll rate.

8. A system for detecting a rollover of a vehicle that includes at least one wheel reaction force sensing device positioned about at least one wheel of the vehicle for transmitting wheel reaction force signals indicative of an amount of force exerted on the at least one of the wheels of the vehicle, the system comprising:
    a controller operably coupled to the at least one wheel reaction force sensing device and including at least one roll angle sensor for transmitting roll angle signals indicative of an angular rotation of the vehicle body, the controller being configured to:
        determine a first force index in response to the wheel reaction force signals,
        determine a first roll angle in response to the roll angle signals,
        determine a first roll rate of the vehicle in response to the roll angle signals,
        compare the first force index to a threshold force index the first roll angle to a threshold roll angle,
        compare at least one of the first roll angle to a threshold roll angle and the first roll rate to a threshold roll rate, and
        deploy the restraint system in response to the comparison of the first force index to the threshold force index and the comparison of the at least one of the first roll angle to the threshold roll angle and the first roll rate to the threshold roll rate.

9. The system of claim 8 wherein the controller further includes at least one accelerometer sensor for transmitting acceleration signals indicative of vehicle body accelerations about at least one axis of the vehicle.

10. The system of claim 9 wherein the controller is further configured to determine a first lateral acceleration of the vehicle in response to the acceleration signals, to compare the first lateral acceleration to a threshold lateral acceleration, and to deploy the restraint system in response to a comparison of the first force index to the threshold force index and the first lateral acceleration to the threshold lateral acceleration.

11. The system of claim 9 wherein the controller is configured to perform a safing function with the acceleration signals prior to deploying the restraint system.

12. The system of claim 11 wherein the controller is configured to determine at least one of a first lateral acceleration and a first vertical acceleration in response to the acceleration signals and perform the safing function with the first lateral acceleration and the first vertical acceleration.

13. The system of claim 8 wherein the first force index corresponds to a first force measurement at one or more left wheels of the vehicle, a second force measurement at one or more right wheels of the vehicle, and an average force between the one or more left wheels and the one or more right wheels of the vehicle.

14. A method for detecting a rollover of a vehicle, the method comprising:
   receiving wheel reaction force signals indicative of an amount of force exerted on at least one wheel of the vehicle;
   receiving an acceleration signal indicative of vehicle body accelerations about at least one axis of the vehicle;
   receiving a roll angle signal indicative of an angular rotation of the vehicle body;
   determining a first force index in response to the wheel reaction force signals;
   determining a first lateral acceleration of the vehicle in response to the acceleration signals;
   determining at least one of a first roll angle and a first roll rate of the vehicle in response to roll angle signal; and
   comparing at least one of the first force index to a threshold force index, the first lateral acceleration to a threshold lateral acceleration, the first roll rate to a threshold roll rate, and the first roll angle to a threshold roll angle to determine whether to deploy a restraint system.

15. The method of claim 14 further comprising performing a safing function with the acceleration signals prior to deploying the restraint system.

16. The method of claim 14 further determining a first vertical acceleration in response to the acceleration signals and performing the safing function with the first lateral acceleration and the first vertical acceleration.

17. The method of claim 14, wherein the first force index corresponds to a first force measurement at one or more left wheels of the vehicle, a second force measurement at one or more right wheels of the vehicle, and an average force between the one or more left wheels and the one or more right wheels of the vehicle.

* * * * *